July 14, 1931.  A. M. TROGNER  1,814,235
FLUID FLOW INDICATOR
Filed Dec. 10, 1928  2 Sheets-Sheet 1
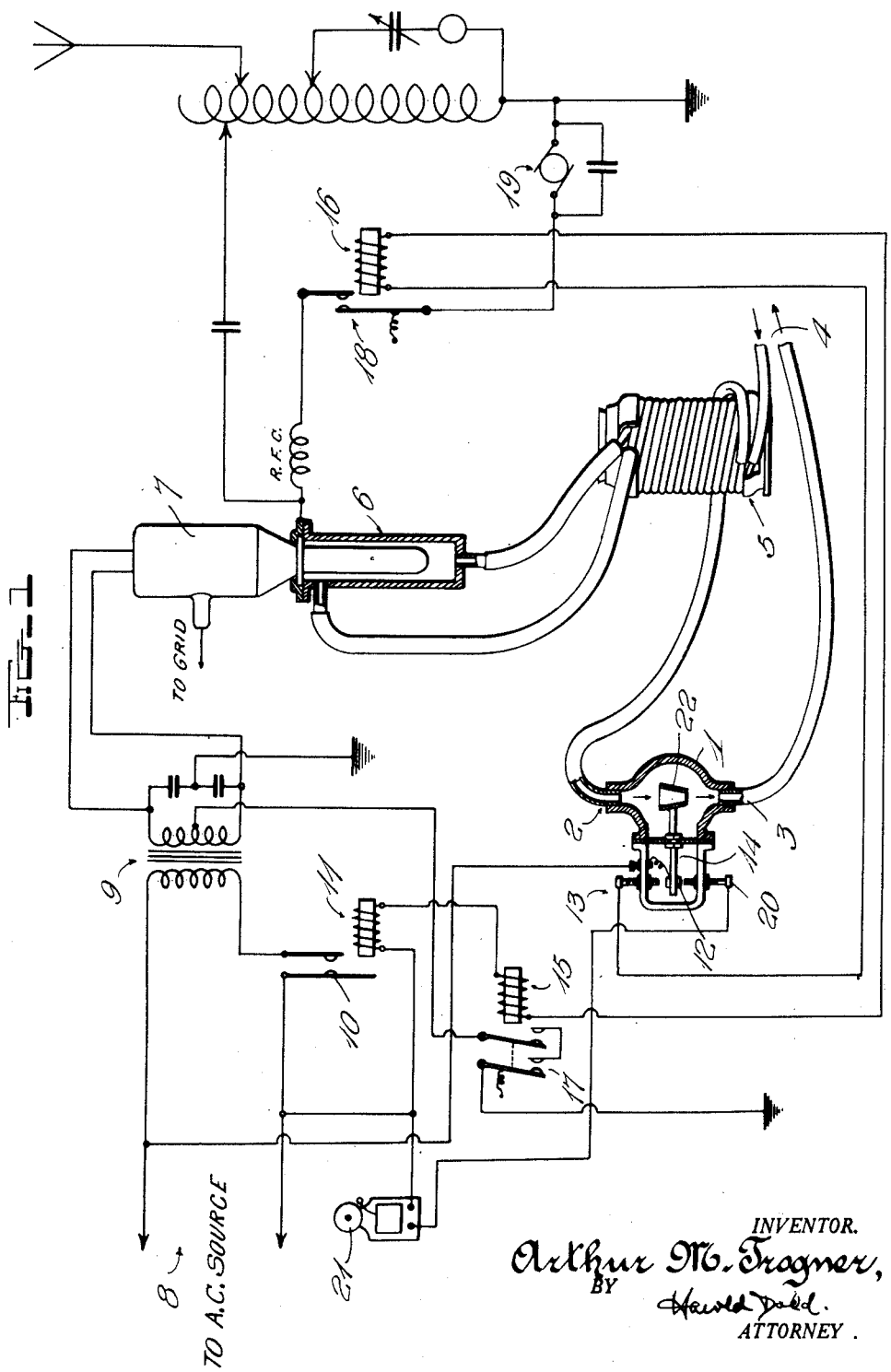
INVENTOR.
Arthur M. Trogner,
BY Harold Dodd.
ATTORNEY.

July 14, 1931. A. M. TROGNER 1,814,235
FLUID FLOW INDICATOR
Filed Dec. 10, 1928 2 Sheets-Sheet 2
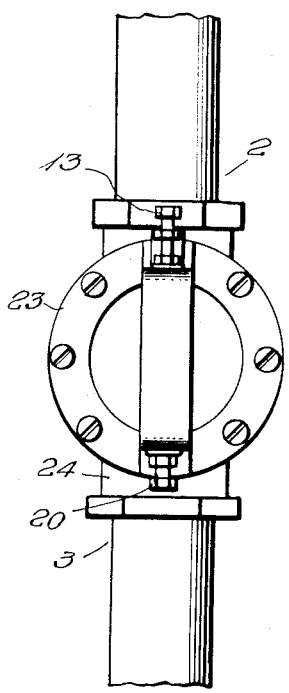
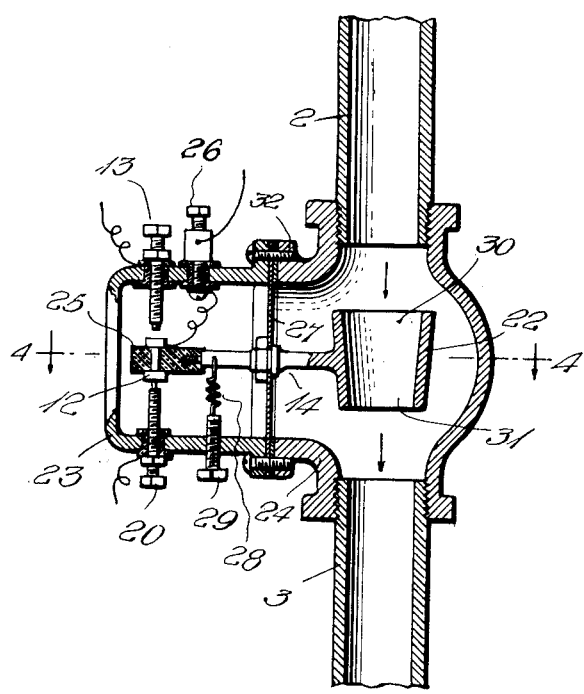
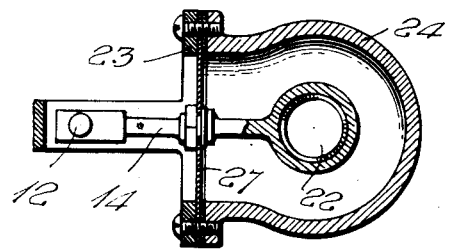
INVENTOR.
Arthur M. Trogner,
BY Harold Dodd,
ATTORNEY Patented July 14, 1931

1,814,235

UNITED STATES PATENT OFFICE

ARTHUR M. TROGNER, OF EAST ORANGE, NEW JERSEY, ASSIGNOR TO WIRED RADIO, INC., OF NEW YORK, N. Y., A CORPORATION OF DELAWARE

FLUID FLOW INDICATOR

Application filed December 10, 1928. Serial No. 325,108.

My invention relates to fluid flow indicators in general and more specifically to fluid flow indicators by which electrical circuits are controlled.

An object of my invention is to provide a fluid flow indicator whereby the flow of fluids through a pipe line controls electrical circuits.

Another object of my invention is to provide a fluid flow indicator whereby changes in the rate of flow are indicated by the control of a plurality of electrical circuits.

Other and further objects of my invention reside in the method of employing the fluid flow indicator in a thermionic tube transmitting system and in the structural features of the fluid flow indicator of my invention, a better understanding of which can be had by referring to the specification following and to the accompanying drawings wherein, Figure 1 is a diagrammatic illustration showing the fluid flow indicator of my invention employed in combination with a thermionic tube system; Fig. 2 shows an end view of the fluid flow indicator of my invention and Figs. 3 and 4 are illustrations showing cross-sections of the fluid flow indicator of my invention.

The fluid flow indicator of my invention is particularly designed to be employed in combination with thermionic tube rectifier and transmitting systems. The fluid flow indicator of my invention is shown in Fig. 1 wherein 1 represents the fluid flow indicator in its entirety. Fluid flow indicator 1 is connected to source of fluid circulation 4 and hose coil 5 by means of conductors 2 and 3. Hose coil 5 conducts the circulating fluid from source 4 to and from socket 6 of thermionic tube 7. The cathode circuit of thermionic tube 7 is energized from source 8 by means of transformer 9. The primary circuit of transformer 9 is completed by means of contact members 10 associated with electromagnet 11. The energization of electromagnet 11 depends upon the closing of contact members 12 and 13 associated with the armature 14 of indicator 1. The energization of electromagnets 15 and 16 likewise depends upon the closing of contact members 12 and 13. The energization of electromagnets 15 and 16 closes the contact members 17 and 18 respectively, whereby the anode of thermionic tube 7 is energized from source 19. Failure of the fluid circulation causes contact members 13 and 12 to open and contact members 12 and 20 to close. The closing of contact members 12, 20 energizes alarm 21 thereby warning the attending operator of the danger. The actuation of armature 14 is caused by the resistance offered by conical shaped member 20 to the flow of the fluid. A better understanding can be had of the fluid flow indicator of my invention by referring to Figs. 2, 3 and 4 which show the structural features in greater detail.

Fig. 2 shows an end elevational view of the fluid flow indicator of my invention wherein fluid conducting pipes 2 and 3 are connected to casing 24. A cup-shaped member 23, enclosing the movable contact member, is carried by the side outlet of casing 24. Cup-shaped member 23 supports contact members 13 and 20. Casing 24 resembles a double sweep T fitting and is more fully illustrated in Fig. 3. Fig. 3 shows a cross-section and side elevational view of the fluid flow indicator of my invention. Fluid conducting pipes 2 and 3 are joined to a double sweep T casing 24 to the side outlet 32 of which is positioned a cup-shaped member 23. Cup-shaped member 23 supports contact members 13, 20 and binding post 26. Between cup-shaped member 23 and the side outlet of casing 24 there is positioned a diaphragm 27 which prevents the fluid from reaching the cup-shaped member 23 and contact members 13, 20. An armature 14 is secured to diaphragm 27 and extends from orifice 22 to insulating member 25. An insulating member 25 is carried by armature 14 and supports contacting members 12. Contact members 12 are electrically connected to binding post 26. Binding post 26 and contact members 13 and 20 are supported by insulating members. Diaphragm 27 may have sufficient resilient properties to restore armature 14 to normal position or a spring 28 having an adjustment screw 29 may be provided. Orifice 22 consists of a conical, nozzle-like reducer. The loss due to friction through orifice 22 gives rise to the displacement of orifice 22 and correspondingly the movement of contact members 12. Orifice 22 may be designed according to the particular application and any convergence angle may be employed suitable to cause the necessary movement of armature 14. Fig. 4 shows a top cross-sectional view of the fluid flow indicator of my invention, the reference characters herein corresponding to the reference characters employed in Fig. 3. Cup-shaped member 23 may be of any suitable insulating material or may consist of metal or an alloy thereof and provided with insulating members for supporting the contact members as illustrated in the accompanying drawings. Diaphragm 27 may be of metal or an alloy having a high resistance to corrosion. In the operation of the fluid flow indicator of my invention the fluid enters casing 24 by means of pipe 2 which is fitted thereto. Casing 24 resembles a double sweep T pipe fitting having a side outlet 32. The fluid enters inlet 30 and is discharged from the throat 31 of orifice member 22, to fluid conducting pipe 3. The flow of fluid through orifice 22 causes it to move in the direction of the stream. Should fluid conducting pipe 3 be closed or clogged thereby preventing the circulation of the liquid through orifice 22, no motion will be transmitted to armature member 14. In pressure gauges of the type generally employed an indication would be had irrespective of this condition. The pressure against a diaphragm 27 for instance would be present when a clogged condition of pipe 3 occurs, which is similar in many respects to the operation of pressure gauges in general. Under such conditions the pressure remaining in pipe 2 and casing 24 would not cause a displacement of orifice member 22. The stoppage removed from pipe 3 would allow the flow of fluid and orifice 22 would be displaced. The above mentioned feature of the fluid flow indicator of my invention offers many advantages over the ordinary type of pressure gauges heretofore employed. The importance of this advantage can best be realized by referring to Fig. 1.

Suppose that a fluid pressure gauge of the usual design was employed in the position occupied by the fluid flow indicator of my invention as illustrated in Fig. 1 of the accompanying drawings. As is ordinarily the practice, a decrease in the pressure of the circulating fluid would cause the overload circuit breakers to operate and the removal of the anode potential supply from source 19. Should the circulation of the cooling fluid be totally obstructed in conductor 3 such a gauge as above referred to, would continue to register the pressure and the circuit breakers would not be actuated. The continuance of the anode supply potential to thermionic tube 7 from source 19 would cause the temperature of the anode to rise to an excessive value causing damage or destruction to the tube. The fluid flow indicator of my invention would immediately respond to the change in rate of flow or absence of flow and cause the removal of the supply potential from source 19. Suitable contact members may be employed whereby the closing of the circuit short circuits the electromagnet of a circuit breaker instead of opening the circuit for energizing the electromagnet as shown in Fig. 1 of the accompanying drawings.

I realize that many modifications of the fluid flow indicator of my invention are possible without departing from the spirit of my invention. Orifice member 22 may consist of any suitable material and have a convergence angle suitable to the particular application concerned. It is to be understood that the embodiments of my invention are not to be restricted to the foregoing specification or to the accompanying drawings but only as defined in the appended claims.

What I claim as new and desire to secure by Letters Patent of the United States is as follows:

1. A fluid flow indicator comprising in combination a double sweep T casing having an inlet and discharge connection, a resilient diaphragm on one side of said casing, a horizontal rod secured through and perpendicular to the plane of said diaphragm, an orifice member carried by said rod and enclosed by said casing in alignment with the inlet and discharge connections thereto, and contact means adapted to be closed by the movement of the opposite end of said rod.

2. A fluid flow indicator comprising in combination a double sweep T casing having an inlet and discharge connection, a resilient diaphragm extending across the side of said casing, a horizontal rod secured through and perpendicular to the plane of said diaphragm and carried by said diaphragm, a tubular orifice member carried by one end of said rod and enclosed by said casing in the path of said inlet and discharge connections, and a contact system adapted to be closed by the opposite end of said rod.

3. A fluid flow indicator comprising in combination a double sweep T casing having an inlet and discharge connection, a resilient diaphragm closing one side of said casing, a horizontal rod extending centrally through said diaphragm and perpendicular to the plane thereof an orifice member having the shape of a frustum of a cone, carried by one end of said rod and enclosed by said casing in a position free to move according to the pressure of fluid flow therethrough, and a contact system carried by the opposite end of said rod.

4. A fluid flow indicator comprising in combination a double sweep T casing having an inlet and discharge connection, a flexible diaphragm positioned closing one side of said casing, a horizontal rod secured through and perpendicular to the plane of said diaphragm an orifice member having differing cross sections carried by one end of said rod and enclosed by said casing in a position free to move between said inlet and discharge connections under control of the pressure of fluid passing through said casing, and an electrical contact system operated by the opposite end of said rod.

5. A fluid flow indicator comprising in combination a double sweep T casing having inlet and discharge connections at opposite ends thereof, a flexible metallic diaphragm positioned closing one side of said casing, a horizontal rod secured through and perpendicular to the plane of said diaphragm, an orifice member carried by one of said rod in alignment with said inlet and discharge connections, contacts carried by the opposite end of said rod and fixed cooperative contacts positioned on opposite sides of the contacts on said rod whereby changes in fluid pressure acting upon said orifice member selectively shifts the contacts on said rod into or out of connection with the fixed cooperative contacts.

6. A fluid flow indicator comprising in combination a T shaped casing having inlet and discharge connections at opposite ends thereof, a diaphragm closing the side of said casing, a horizontal member secured through and common with the axis of said diaphragm, a nozzle shaped member carried by one end of said member inside said casing and a contact system operated by said member outside said casing, said nozzle shaped member being shifted in position by changes in fluid pressure through said casing for correspondingly actuating said contact system.

7. A fluid flow indicator comprising in combination a T shaped casing having inlet and discharge connections at opposite ends thereof, a diaphragm closing one side of said casing, a horizontal member secured through and common with the axis of said diaphragm and a nozzle shaped member carried by said member and enclosed by said casing, said nozzle having the bore thereof extending perpendicular to the axis of said diaphragm and a contact system controlled by the opposite end of said member, whereby changes in fluid pressure through said nozzle shift said horizontal member in said diaphragm to different positions with respect to said contact system.

8. A fluid flow indicator comprising in combination a double sweep T casing having inlet and discharge connections at opposite ends thereof, a diaphragm closing one side of said casing, a horizontal rod secured through and perpendicular to the plane of said diaphragm, an orifice member carried by one end of said rod and enclosed by said casing and contact members carried by the opposite end of said horizontal rod whereby an electrical circuit is controlled by the movement of said orifice member in accordance with changes in fluid pressure.

9. A fluid flow indicator comprising in combination a double sweep T casing having inlet and discharge connections at opposite ends thereof, a diaphragm closing one side of said casing, a horizontal rod secured through and perpendicular to the plane of said diaphragm, an orifice member carried by one end of said rod and enclosed by said casing and a plurality of contact members carried by the other end of said horizontal rod and cooperatively related to sets of fixed contacts whereby a plurality of electrical circuits are controllable by the movement of said orifice member under conditions of fluid pressure changes.

10. A fluid flow indicator comprising in combination a T shaped casing having inlet and discharge connections at opposite ends thereof, a diaphragm closing one side of said casing, a horizontal member secured through and common with the axis of said diaphragm a plurality of electrical contact members carried by one end of said horizontal member outside of said diaphragm in cooperative relation to a set of fixed contacts and a nozzle shaped member carried by the opposite end of said member and enclosed by said casing on the opposite side of said diaphragm in alignment with said inlet and discharge connections, whereby changes in fluid pressure through said casing serve to shift said horizontal member with respect to said set of fixed contacts for controlling electrical circuits according to the flow of the fluid.

11. A fluid flow indicator comprising in combination a T shaped casing having inlet and discharge connections at opposite ends thereof, a diaphragm closing one side of said casing, a horizontal member secured through and common with the axis of said diaphragm, a plurality of electrical contact members carried by one end of said horizontal member and external to said casing, a fixed contact positioned above and below said contact members, and a nozzle shaped member carried by the other end of said member and enclosed by said casing, whereby said horizontal member is moved with respect to said fixed contacts by varying fluid pressure for controlling a multiplicity of electrical circuits.

12. A fluid flow indicator comprising in combination a T shaped casing having inlet and discharge connections at opposite ends thereof, a diaphragm positioned to the side outlet of said casing, a horizontal member extending through and common with the axis of said diaphragm, a plurality of electrical contact members carried by said horizontal member, contact members located external to said casing and connected with a plurality of electrical circuits and a nozzle shaped member carried by said member and enclosed by said casing, whereby said horizontal members are moved with respect to said contact members by variations in fluid pressure through said casing.

ARTHUR M. TROGNER.